United States Patent
Llerena et al.

(10) Patent No.: US 11,005,388 B2
(45) Date of Patent: May 11, 2021

(54) SINGLE-PHASE MULTI-LEVEL ASYMMETRIC INVERTER WITH AC-BYPASS AND ASYMMETRIC MODULATION STRATEGY

(71) Applicant: Sonnen, Inc., Tucker, GA (US)

(72) Inventors: Alberto Berzoy Llerena, Clarkston, GA (US); Andres Salazar-Llinas, Decatur, GA (US); Carlos Restrepo, Atlanta, GA (US)

(73) Assignee: sonnen, Inc., Stone Mountain, GA (US)

( * ) Notice: Subject to any disclaimer, the term of this patent is extended or adjusted under 35 U.S.C. 154(b) by 0 days.

(21) Appl. No.: 16/289,022

(22) Filed: Feb. 28, 2019

(65) Prior Publication Data
US 2020/0280267 A1    Sep. 3, 2020

(51) Int. Cl.
| H02M 7/487 | (2007.01) |
| H02M 1/14 | (2006.01) |
| H02M 1/44 | (2007.01) |
| H02M 7/5387 | (2007.01) |

(52) U.S. Cl.
CPC .......... *H02M 7/487* (2013.01); *H02M 1/14* (2013.01); *H02M 1/44* (2013.01); *H02M 7/53871* (2013.01)

(58) Field of Classification Search
CPC ........ H02M 7/483; H02M 7/487; H02M 1/08; H02M 2001/0054; H02M 2007/4835; H02M 7/48; H02M 7/53871; H02M 7/537; H02M 7/53875; H02M 7/5395; H02M 7/68; H02M 7/79; H02M 7/757
See application file for complete search history.

(56) References Cited

U.S. PATENT DOCUMENTS

| 6,058,031 | A | 5/2000 | Lyons et al. | |
| 6,940,736 | B2 | 9/2005 | Jonsson | |
| 8,462,526 | B2 | 6/2013 | Mabuchi et al. | |
| 9,030,854 | B2 | 5/2015 | Escobar et al. | |
| 9,252,670 | B2 * | 2/2016 | Schroeder | H02M 3/335 |
| 9,337,746 | B2 | 5/2016 | Yoo | |
| 9,419,541 | B2 | 8/2016 | Yoo | |
| 9,595,862 | B1 * | 3/2017 | Fu | H02M 7/483 |
| 9,641,079 | B2 | 5/2017 | Schmalnauer et al. | |
| 9,979,318 | B2 | 5/2018 | Kadam et al. | |
| 2006/0245216 | A1 | 11/2006 | Wu et al. | |
| 2013/0014384 | A1 * | 1/2013 | Xue | H02M 7/49 29/825 |

(Continued)

FOREIGN PATENT DOCUMENTS

| CN | 102983765 | 3/2013 |
| WO | 2011/100738 | 8/2011 |
| WO | 2017/152181 | 9/2017 |

*Primary Examiner* — Gustavo A Rosario-Benitez
(74) *Attorney, Agent, or Firm* — Clive McClintock

(57) ABSTRACT

A multi-level inverter includes a coupling to a DC power source and a coupling to an AC power source, a plurality of capacitors arranged to create a set of nodes, and a plurality of switches located between the capacitors and the AC power source. Switches are configured to create an AC bypass in which the capacitors coupled to the DC power source may be isolated from the AC power source. The AC bypass is utilized as one of the switching states in a switching sequence that provides enhanced performance including but not limited to reduced electromagnetic interference and ripple.

20 Claims, 22 Drawing Sheets

(56) References Cited

U.S. PATENT DOCUMENTS

| | | | |
|---|---|---|---|
| 2014/0376287 A1* | 12/2014 | Narimani | H02M 3/07 |
| | | | 363/60 |
| 2015/0311822 A1* | 10/2015 | Ma | H02M 7/53871 |
| | | | 363/98 |
| 2017/0133947 A1* | 5/2017 | Fu | H02M 7/487 |
| 2017/0187304 A1 | 6/2017 | Fujii et al. | |
| 2018/0062537 A1* | 3/2018 | Wang | H02J 3/383 |
| 2018/0241320 A1* | 8/2018 | Wang | H02M 7/483 |
| 2020/0021203 A1* | 1/2020 | Xie | H02M 7/487 |

\* cited by examiner

Table I. Main inverter voltages with $L_1 = L_2 = L/2$

| Switching state | $S_{1a}$ | $S_{2a}$ | $S_{3a}$ | $S_{4a}$ | $S_{1b}$ | $S_{2b}$ | $S_{3b}$ | $S_{4b}$ | Output $v_{dm}$ |
|---|---|---|---|---|---|---|---|---|---|
| P | ON | OFF | OFF | OFF | OFF | ON | OFF | OFF | $V_{dc}$ |
| N | OFF | ON | OFF | OFF | ON | OFF | OFF | OFF | $-V_{dc}$ |
| P/2 | OFF | OFF | ON | ON | OFF | ON | OFF | OFF | $\dfrac{V_{dc}}{2}$ |
| N/2 | OFF | OFF | ON | ON | ON | OFF | OFF | OFF | $-\dfrac{V_{dc}}{2}$ |
| $0_P$ | ON | OFF | OFF | OFF | ON | OFF | OFF | OFF | 0 |
| $0_N$ | OFF | ON | OFF | OFF | OFF | ON | OFF | OFF | 0 |
| $0_1$ | OFF | OFF | OFF | OFF | OFF | OFF | ON | ON | 0 |
| $0_2$ | OFF | OFF | OFF | OFF | OFF | OFF | ON | ON | 0 |

FIG 5

Table II. Switching frequency of the transistors in between the voltage level transition

| Switching Transition | $S_{1a}$ | $S_{2a}$ | $S_{3a}$ | $S_{4a}$ | $S_{1b}$ | $S_{2b}$ | $S_{3b}$ | $S_{4b}$ | Output $v_{dm}$ |
|---|---|---|---|---|---|---|---|---|---|
| $P$ and $P/2$ | $f_{sw}$ | $f_{g(off)}$ | $f_{g(on)}$ | $f_{sw}$ | $f_{g(off)}$ | $f_{g(on)}$ | $f_{g(off)}$ | $f_{g(on)}$ | $V_{dc}$ and $\frac{V_{dc}}{2}$ |
| $N$ and $N/2$ | $f_{g(off)}$ | $f_{sw}$ | $f_{sw}$ | $f_{g(on)}$ | $f_{g(on)}$ | $f_{g(off)}$ | $f_{g(on)}$ | $f_{g(off)}$ | $-V_{dc}$ and $-\frac{V_{dc}}{2}$ |
| $P/2$ and $0_1$ | $f_{g(off)}$ | $f_{g(off)}$ | $f_{g(on)}$ | $f_{sw}$ | $f_{g(off)}$ | $f_{sw}$ | $f_{sw}$ | $f_{g(on)}$ | $\frac{V_{dc}}{2}$ and 0 |
| $N/2$ and $0_2$ | $f_{g(off)}$ | $f_{g(off)}$ | $f_{sw}$ | $f_{g(on)}$ | $f_{sw}$ | $f_{g(off)}$ | $f_{g(on)}$ | $f_{sw}$ | $-\frac{V_{dc}}{2}$ and 0 |

FIG 11

SINGLE-PHASE MULTI-LEVEL ASYMMETRIC INVERTER WITH AC-BYPASS AND ASYMMETRIC MODULATION STRATEGY

TECHNICAL FIELD

The present disclosure belongs to the field of power source technologies, and specifically, relates to a single-phase multi-level inverter with AC-bypass and asymmetric modulation strategy.

BACKGROUND OF THE INVENTION

Renewable energy, in particular photovoltaic (PV) solar energy, has become globally widespread. PV energy systems are frequently connected to an energy storage system (ESS), typically a direct current (DC) battery, to allow for storage and controlled distribution of energy. The ESS is commonly connected to a nearby alternating current (AC) utility grid and/or a local AC energy load. The ESS is capable of operating in at least two modes, including grid-connected (grid-tied) or islanded mode (also named back-up mode or off-grid mode). In addition to or in place of PV solar energy systems, the ESS may be connected to other renewable energy sources such as wind power or hydroelectric power, or standard fuel-power generators.

A power inverter, or inverter, is an electronic device that changes DC to AC, and vice-versa. An inverter is required to effectively use battery power from an ESS in many common applications, because batteries operate on DC and both the utility-grid and common electronics operate on AC. The input voltage, output voltage, frequency, and overall power handling depend on the design of the inverter.

A power inverter device that produces a multi-step sinusoidal waveform is referred to as a sine-wave inverter. The goal of a sine-wave inverter is to create an alternating current that mimics a sinusoidal waveform. However, inverters typically do an imperfect job of generating a pure sinusoidal wave, resulting in distortions. Although many electronics are able to function on distorted sinusoidal AC, motors operated on non-sinusoidal power may produce extra heat and may generate more audible noise than when running on sinusoidal power.

Multilevel inverters are a common power topology for high and medium power applications such as the utility interface for renewable power sources and flexible AC transmission systems. The T-clamped multilevel inverter is commonly referred to as a three-level T-clamped neutral point clamped (T-NCP) inverter. A three-level T-NCP inverter requires two series connected capacitors coupled between the DC-link. Each capacitor is charged to an equal potential when balanced. Furthermore, the "three-level" (3L) T-NCP inverter may comprise four switching elements. The T-clamping helps to reduce the average voltage stress (sometimes Vstress=Vdc/2 and sometimes Vstress=Vdc) on the switching elements compared to the typical single-phase full-bridge (always Vstress=Vdc). In addition to three-level inverters, "five-level" (5L) inverters are sometimes used to improve the sine waveform.

Typically, energy storage systems suffer from several problems due to electronic components like inverters. These problems include, but are not limited to, current ripple in the grid-tied mode and voltage ripple in the off-grid mode. Normally, these problems are addressed by passive filtering with large value inductors and capacitors. However, these components are expensive and even more costly if they need to be custom made, like chokes. Associated with the ripple issue there are also conducted electromagnetic emissions (EMI), which must comply with industry standards, and involve involving additional costly filtering stages.

The typical full-bridge and T-NPC single-phase inverters realize three voltage levels (Vdc, −Vdc, and 0). The typical 3L inverter pollutes the grid to a greater degree than higher level inverters (for example the 5L voltage source inverter VSI) because the derivative of the voltage with respect to time (dVinv/dTs) for the VSI is greater, assuming the same switching frequency of operation.

Typical systems also use low frequency (LF) transformers. The LF transformer provides galvanic isolation between the utility-grid and the ESS. The LF transformer also provides isolation between the battery and the grid ground, limiting the common mode current. The LF transformer ensures that no direct current, which could saturate the distribution transformer, is injected into the grid. However, LF transformers increase the size, weight, and cost of an ESS and reduce its efficiency. Therefore, a system that eliminates the need for a LF transformer is desirable.

BRIEF SUMMARY OF THE INVENTION

It is an object of the present invention to eliminate the need for an LF transformer in connection with an ESS utilizing a power inverter.

In a first aspect, the present invention is applied to an ESS that is connected to the AC load and/or utility-grid. The ESS contains a battery and a power conversion stage that involves two power converters. The first is a bi-directional synchronous DC/DC buck-boost converter and the second is a DC/AC single-phase "voltage source inverter" ("VSI").

The system can operate in two modes: grid-connected (grid-tied) or islanded mode. The battery can act as either a generator or a load. The function of the DC/DC converter is to regulate the DC-link voltage. The DC/AC VSI is the proposed single-phase multilevel-level (M levels or M-L) asymmetric inverter with AC-bypass. The converter and the inverter are coupled with a DC-link capacitor bank.

In another aspect of the invention, the asymmetric inverter with AC-bypass is a five-level (5L) inverter. In grid-tied mode, the 5L-VSI operates as a bidirectional synchronous rectifier or active regenerative rectifier. In this situation the 5L-VSI controls the grid current magnitude and phase for charging and discharging the battery. The action of charging and discharging the battery can be performed at a unity power factor or at power factor different from the unit (that is when the inverter is conducting ancillary services). The control decides the amount of active and reactive power injected or provided into or by the grid. In the islanded mode (back-up mode) the 5L-VSI operates as inverter. The 5L-VSI controls the AC voltage for the AC load at the terminals. In this situation the system is unidirectional while discharging the battery, although it may charge as well if there are other energy sources available.

In another embodiment of the invention the five voltage levels of the 5L inverter are Vdc, Vdc/2, −Vdc, −Vdc/2, and 0 volts. There are three different ways to implement "0" voltage, or the zero-output switching state, as described below. In a preferred embodiment, one of these ways of implementing the zero-output switching state results in improved performance. The type of modulation or voltage realization is important. In this case, it is proposed that the zero-output switching state is realized by utilizing the AC-bypass. The AC-bypass is achieved by means of the two transistors on the T-clamp (the bidirectional switch) on one of the T-NPC.

The embodiments of the present invention provide benefits including but not limited to improvement of the common mode signaling (voltage and current) by use of the AC-bypass for the zero-voltage state, less conducted and radiated electromagnetic interference (EMI) and less output voltage respect to time (dVinv/dTs), resulting in improved efficiency, cost reduction from increased performance using the same number components as the prior art and without the need for a transformer, and the ability to easily extend the system.

Other aspects and features of the present invention will become apparent to those of ordinary skill in the art upon review of the following description of specific embodiments of the invention in conjunction with the accompanying figures.

BRIEF DESCRIPTION OF THE DRAWINGS

FIG. 5 is a table showing the main inverter voltages of various switching states of a 5L single-phase asymmetric inverter with AC-bypass.

FIG. 11 is a table showing the switching frequency of the transistors of a 5L single-phase asymmetric inverter with AC-bypass in accordance with one embodiment of the present invention.

DETAILED DESCRIPTION OF THE INVENTION

The invention relates generally to an energy storage system utilizing a single-phase multi-level inverter with AC-bypass and asymmetric modulation strategy that does not require a LF transformer. The system can operate in two modes: grid-connected (grid-tied) or islanded mode. The battery can act as either a generator or a load. The function of the DC/DC converter is to regulate the DC-link voltage. The DC/AC VSI is the proposed single-phase multilevel-level (M levels or M-L) asymmetric inverter with AC-bypass. The DC/DC converter and the inverter are coupled with a DC-link capacitor bank. The battery sets the input voltage to Vb, and it can store an excess of energy that has not been consumed by the AC load.

Figure 1:
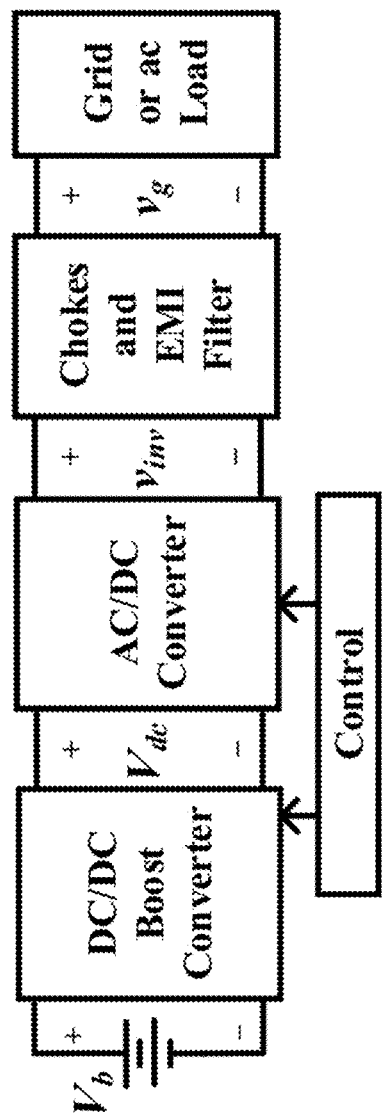
FIG. 1 is a block diagram showing the power block stages connecting a battery to the grid or an AC load.

FIG. 1 is a block diagram showing the power block stages connecting a battery in the energy storage system (ESS) to the grid or an AC load. In the theoretical electrical diagram in FIG. 1, there is no clear path for the common mode current. In real systems, however, stray capacitances appear that provide electrical paths for the common mode current, or ground current. The value of the common mode current is a function of the common mode voltage. However, the value of the common mode current cannot be directly deduced from the common mode voltage since the common mode current is influenced by other voltage sources and elements like the system parasitic elements.

Figure 4:
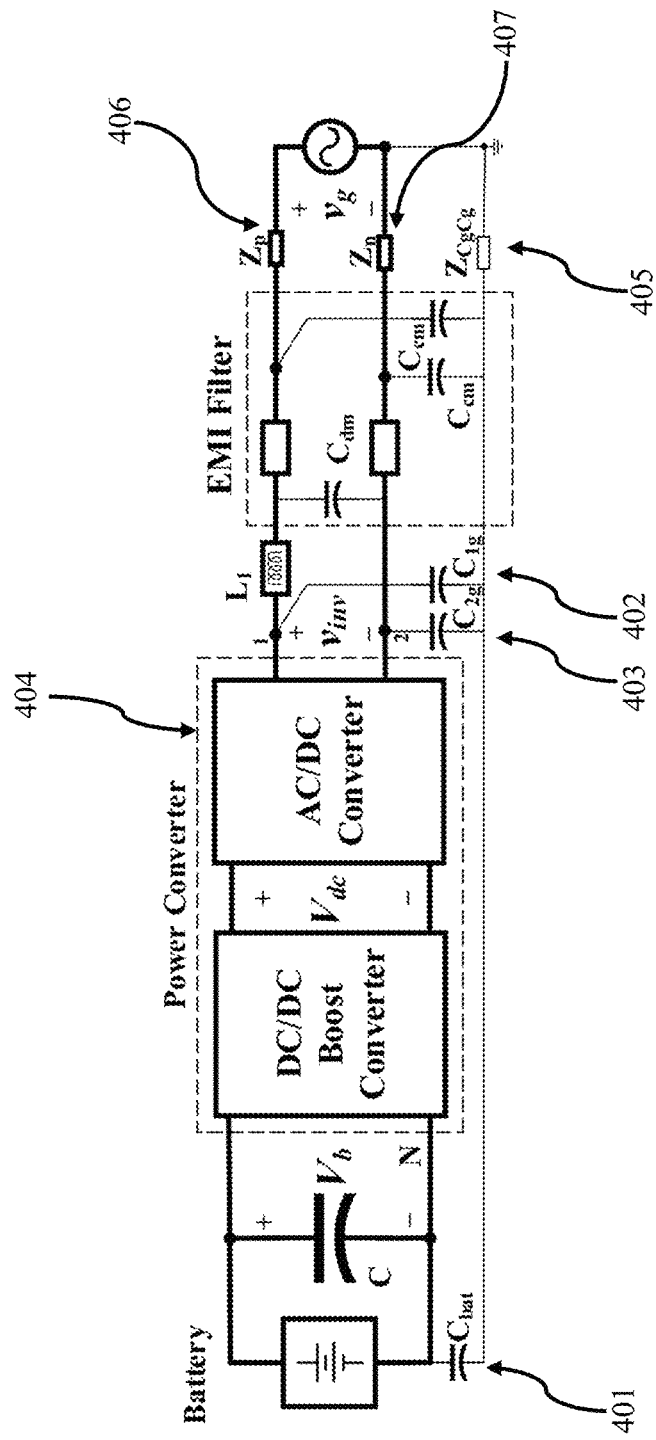
FIG. 4 is a block diagram showing an energy storage system modeling significant stray elements.

FIG. 4 shows a detailed electrical scheme depicting the most important stray elements in an energy storage system, which are modeled as capacitors and inductors that influence the ground current dynamics. In FIG. 4, capacitor 401 represents the stray capacitance between the battery and the ground. This capacitance is distributed over the battery surface. It has been proposed that capacitor 401 can be modeled by two capacitors, with the first one located between the positive battery terminal and the ground, and second located between the negative terminal and the ground. However, modeling with just the one capacitor 401 is accurate enough to evaluate the battery's influence on the common mode. The value of this capacitor 401 is affected by the installation characteristics (ground nature, humidity, connection to the converter, etc.).

Capacitors 402 and 403 represent the stray capacitances between the ground and the output points of power converter 404. The values of capacitors 402 and 403 are a function of the position of the switches and the connection between them and the heat-sink, and the heat-sink to the ground.

Impedance 405 is the series impedance between the ground-connected points of the power converter 404 and the grid. This series impedance is due mainly to the stray ground inductances. Impedances 406 and 407 are the grid series impedances of the phase and neutral conductors, respectively. These are also mainly inductive in nature. One of ordinary skill in the art will understand that there is also a capacitance between the transformer windings of the utility-grid. All of these stray elements may negatively impact the common mode signaling of a system.

The present invention is directed to a family of inverters known as multilevel asymmetric inverters. In a five-level (5L) embodiment, there are two legs (that can be the T-NPC or the typical diode NPC) of switches connected in an asymmetric manner. The T-clamp of one of the legs is connected to the midpoint capacitors, while the T-clamp of the other leg is connected to the output of the inverter (in between the ac terminals). The topology is unique in its structure, allowing for the realization of five levels of voltage in addition to the possibility of short-circuiting the outputs (AC-bypass) without using the switches that realize the levels, that is without the use of the switches 203, 204, 205 and 206 in FIG. 2. Thus, allowing the disconnection of the inverter from the grid at every time that the zero-voltage state is realized. For the zero-voltage state, the bypass is used as opposed to other available zero-switching states. The implementation of the zero-switching state is around 33.2% of the fundamental period of the sinusoidal waveform.

Figure 2:
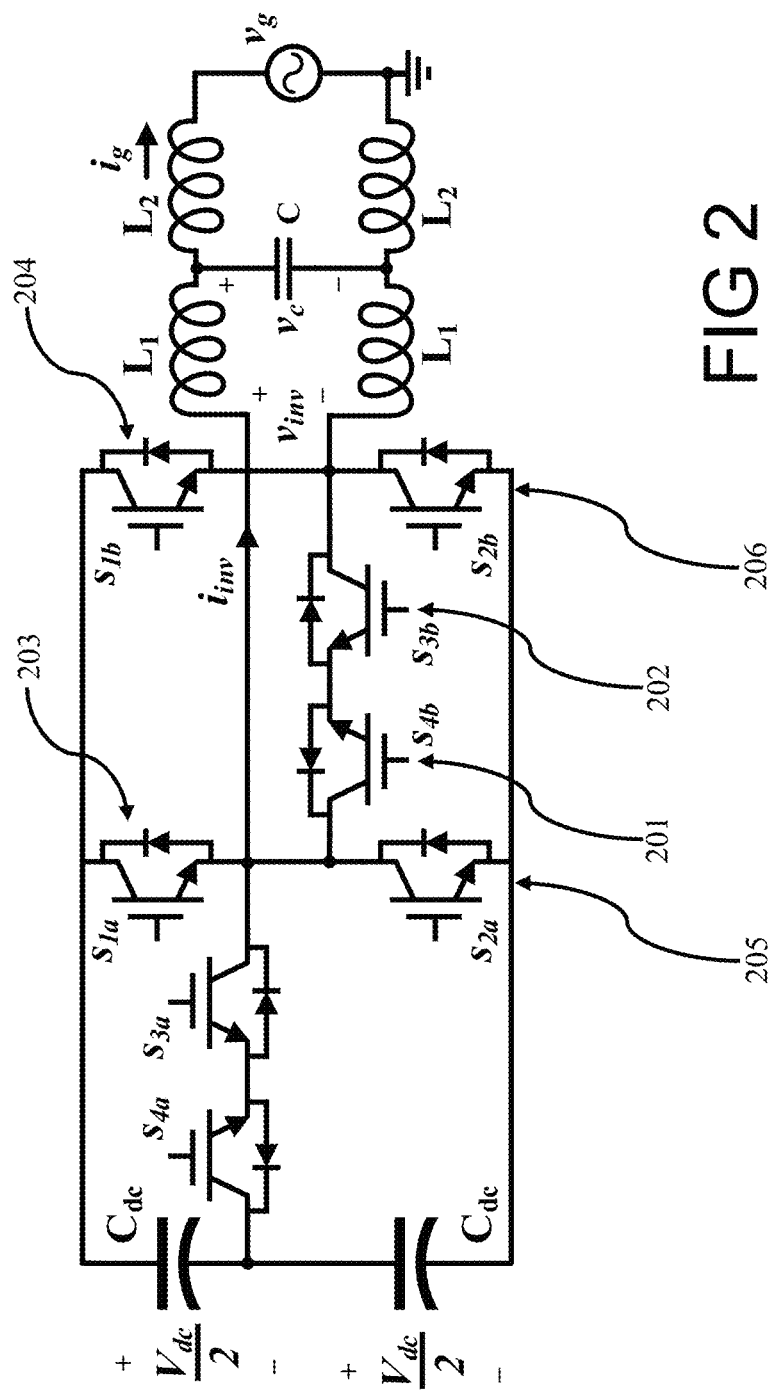
FIG. 2 is a schematic showing the switches in a 5L single-phase asymmetric inverter with AC-bypass in accordance with one embodiment of the present invention.
Figure 3B:
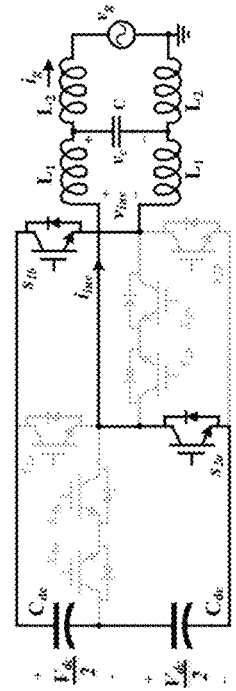
FIG. 3B is a schematic showing a second switching state in a 5L single-phase asymmetric inverter with AC-bypass in accordance with one embodiment of the present invention.
Figure 3D:
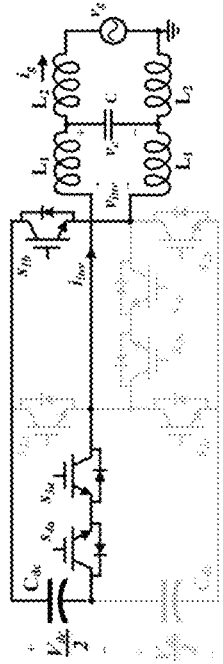
FIG. 3D is a schematic showing a fourth switching state in a 5L single-phase asymmetric inverter with AC-bypass in accordance with one embodiment of the present invention.
Figure 3A:
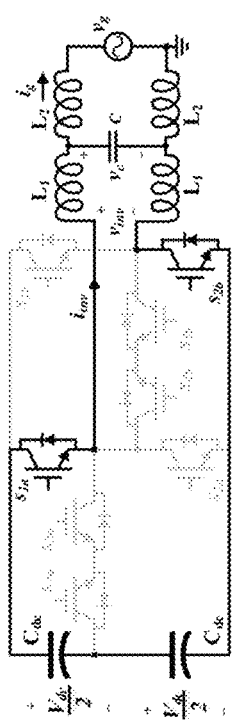
FIG. 3A is a schematic showing a first switching state in a 5L single-phase asymmetric inverter with AC-bypass in accordance with one embodiment of the present invention.
Figure 3C:
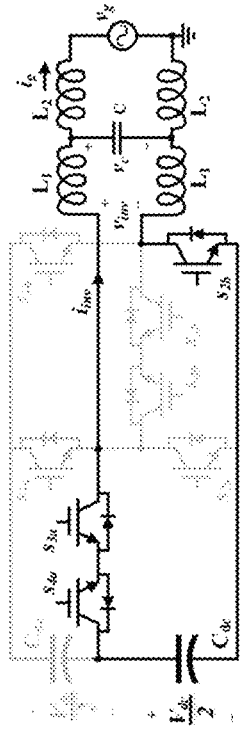
FIG. 3C is a schematic showing a third switching state in a 5L single-phase asymmetric inverter with AC-bypass in accordance with one embodiment of the present invention.
Figure 3E:
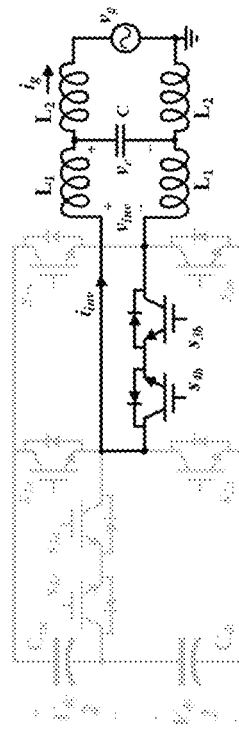
FIG. 3E is a schematic showing a fifth switching state in a 5L single-phase asymmetric inverter with AC-bypass in accordance with one embodiment of the present invention.

FIG. 2 is a schematic showing the switches in a 5L single-phase asymmetric inverter with AC-bypass in accordance with one embodiment of the present invention. As indicated previously, the power conversion consists of a single-phase with the possibility of realizing five voltage levels at the output of the inverter, however, the manner of modulation or voltage realization is important. In a preferred embodiment, the zero-output voltage switching state occurs when switches 201 and 202 are on, and all remaining switches are off. This is the configuration depicted in FIG. 3E. This configuration also represents the AC-bypass, wherein there is no connection between the AC grid or load and the DC battery. The AC-bypass is achieved by means of these transistors and their anti-parallel diodes.

In FIG. 2, the zero-output voltage switching state may be achieved by having switches 203 and 204 on, and all remaining switches off. Additionally, the zero-output voltage switching state may be achieved by having switches 205 and 206 on, and all remaining switches off. However, it has been found that these configurations provide less desirable results than utilizing the AC bypass configuration, from the point of view of the common mode signaling.

FIG. 5 includes Table I, which shows the output voltages of various switching states for the embodiment of the 5L inverter of FIG. 2. A new unipolar modulation strategy is developed as shown in FIGS. 6A-6E, which presents the circuit logic before and after the "pulse width modulation" (PWM) block of the microprocessor to achieve the five levels in accordance with the 5L-asymmetric converter in one embodiment of the present invention.

This unipolar pulse width modulation method achieves at least four improvements: (1) the ground leakage current reduction by using the switching states $0_1$ and $0_2$ from Table I, (2) the average voltage stress reduction on the switching devices as part of the time they will hold the full DC-link voltage and the remaining part of the time they will hold half of the DC-link voltage, (3) the switching losses decrement as the switching devices are going to be commuted at fundamental grid-frequency (Fg which is low frequency range in the order of tens of Hertz) part of the time, and (4) the electromagnetic emissions (conducted and radiated) are reduced as a consequence of the voltage stress reduction which implies less dVinv/dt and improvement on the common mode signaling. The capability of AC-bypass allows the 5L-asymmetric inverter to have an excellent performance from the common mode point of view. It can be demonstrated from the converter switching state voltages that when the line inductors are split between the phase and the neutral-return conductors, the novel modulation strategy avoids the variation of the inverter common mode voltage. Therefore, excellent performance is achieved from the common mode point of view.

Figure 6A:
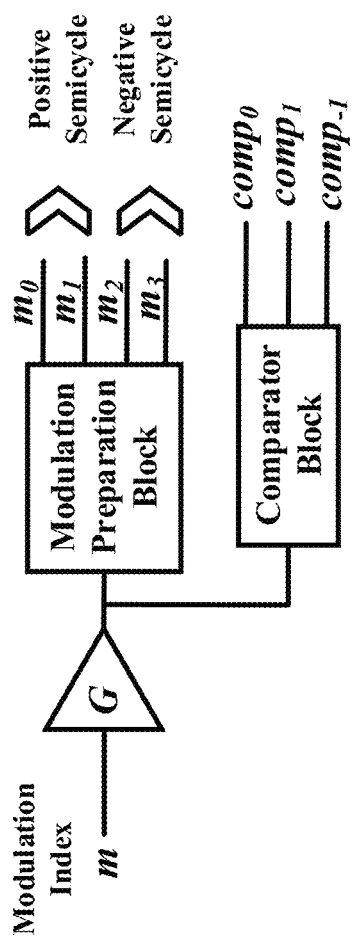
FIG. 6A is a block diagram showing a conditioning logic circuit (preparation circuit) for the modulation of the microprocessor.
Figure 6B:
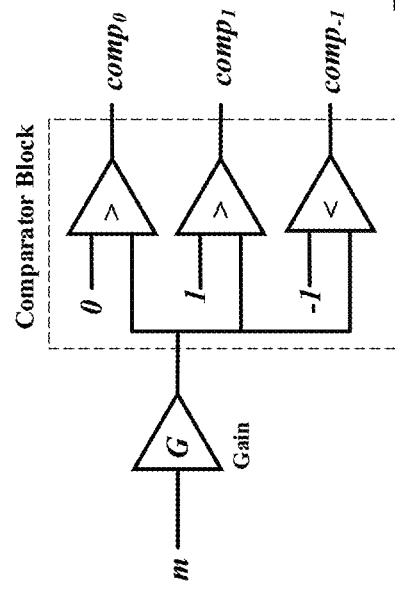
FIG. 6B is a block diagram showing a logic circuit inside of a comparator block.
Figure 6C:
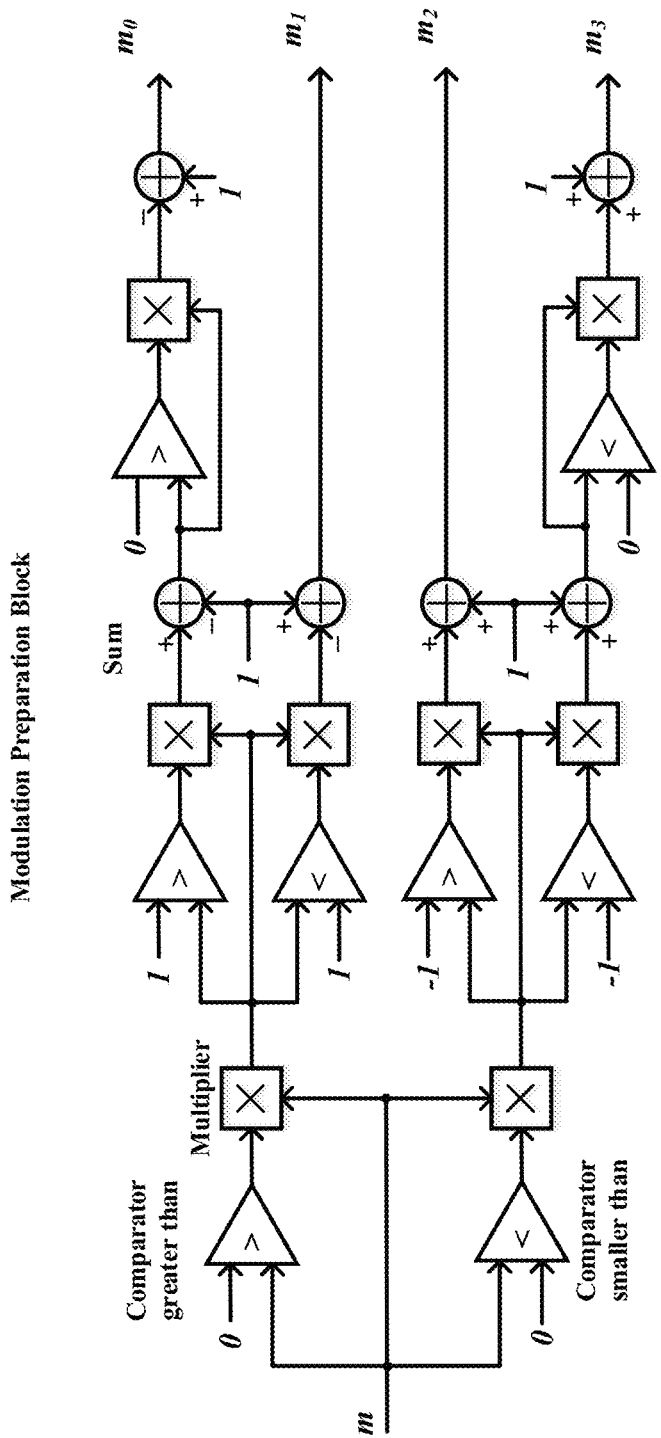
FIG. 6C is a block diagram showing a logic circuit inside of a modulation preparation block.
Figure 6D:
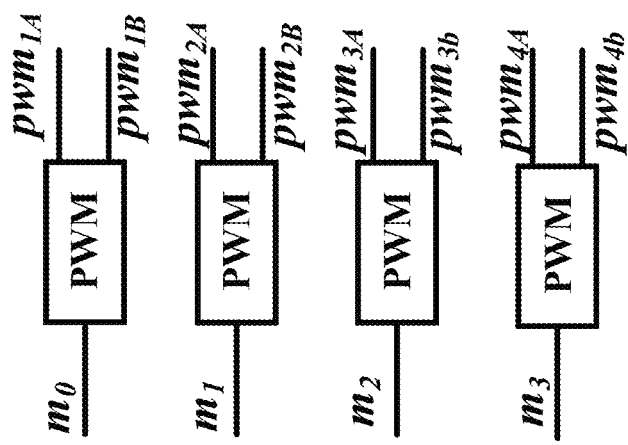
FIG. 6D is a block diagram showing the typical pulse width modulation (PWM) blocks of a microprocessor.
Figure 6E:
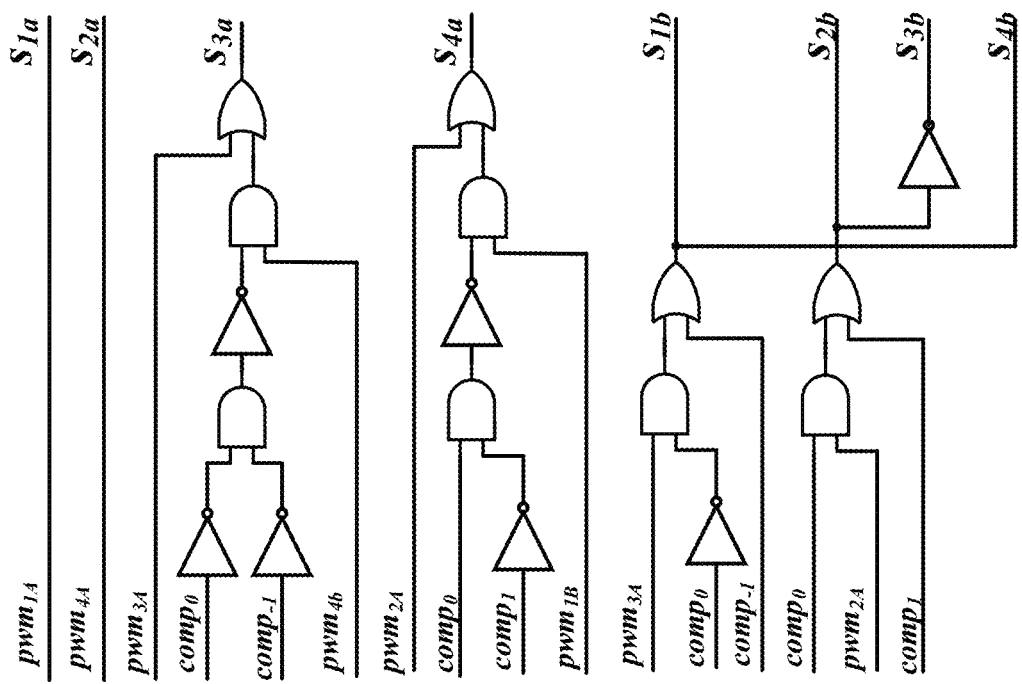
FIG. 6E is a block diagram showing the circuit logic that conditions pulse width modulation for the 5L asymmetric topology.

FIG. 6A presents the preparation circuit in blocks. The comparator block is shown in FIG. 6B where three comparisons are performed; with zero, one, and minus one. The purpose of these comparisons is to achieve a situation in which some switches commute at the switching frequency (Fsw which is in the range of tens of kHz) in a partial time of the fundamental cycle while others are commuting at fundamental grid frequency (Fg or 2Fg). The modulation preparation block is presented in FIG. 6C, where the function is to separate the positive half-cycle from the negative half-cycle. Additionally, the positive half-cycle is divided by two regions, greater and smaller than one, and the negative half-cycle divided in two sections, smaller and greater than minus one. Thus, 4 modulation signals are generated (FIGS. 6A and 6D) named m0, m1, m2 and m3. These modulation signals are the input of the PWM blocks of the microprocessor. Thus, 4 PWMs (FIG. 6D) can be generated with the PWM modules of the microprocessor. FIG. 6E depicts the logic circuit after the PWM. Combining the outputs of the comparator block and the PWM, the proper commutation of the switched can be executed to realize the five levels of the 5L asymmetric inverter.

Figure 7:
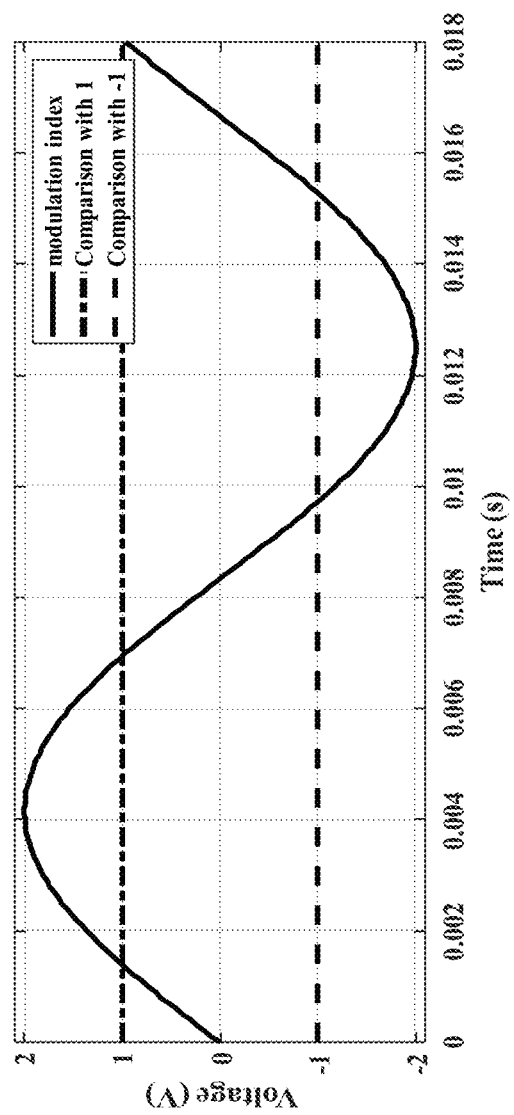
FIG. 7 is a chart showing voltage thresholds for making comparisons on the comparator block for the 5L VSI.
Figure 8:
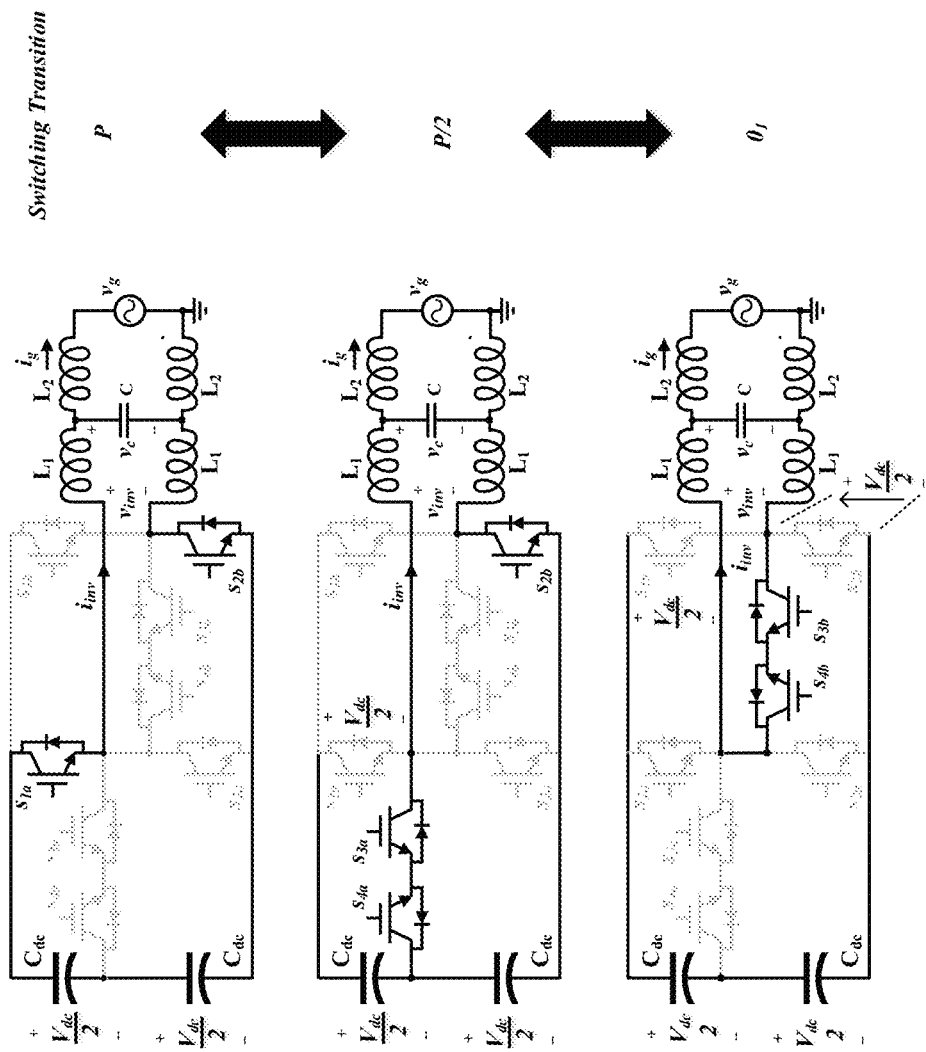
FIG. 8 is a block diagram showing the switching transitions of the positive half-cycle of a 5L single-phase asymmetric inverter with AC-bypass in accordance with one embodiment of the present invention.

FIG. 7 is a chart showing voltage thresholds for making comparisons for the 5L-VSI. In one embodiment of the present invention, efficiency can be improved by reduction of switching losses. Comparing against a prior art 3L full-bridge (FB) inverter, or a prior art HERIC, which has voltage levels similar to the FB, the 5L asymmetric VSI reduces switching losses because the operative blocking voltage in the switches (when the switch is in off-state) is reduced to Vdc/2 part of the time. Specifically, this occurs when the modulation index (signal that inputs to the PWM) is below half of the total modulation index range. Assuming the modulation index range is from −2 to 2, the threshold will be 1.0 for the positive range and −1.0 for the negative range. These thresholds for comparison are indicated in FIG. 7. Thus, when the modulation index is between −1.0 to 1.0, the output blocked voltage of the inverter and the switches will be half of the DC-link (Vdc/2). This will reduce the switching losses because the power lost in the commutation process depends on the current being conducted during the on-state and the voltage blocked during the off-state, for both transitions, from on- to off-state and from off- to on-state. The switching transitions for the positive state are shown in FIG. 8.

Figure 9:
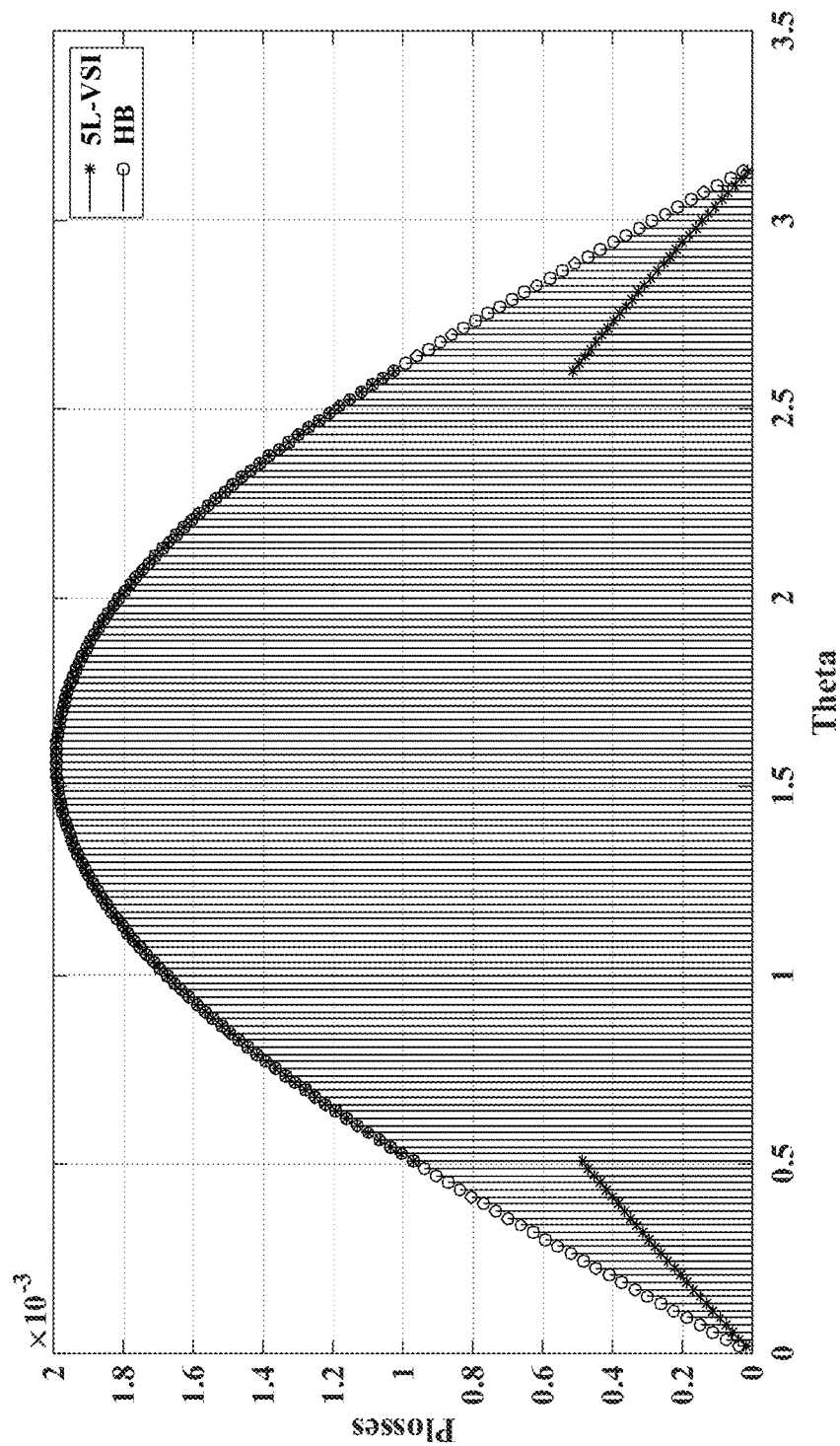
FIG. 9 is a chart showing a losses comparison between the FB and a 5L-VSI during positive half of the cycle.

In more detail, the switching losses can be evaluated by the following formula: Plosses=sum{k=0:Nsw} (0.5*Voff*Ion*(t_rise+t_fall)*Fsw)=Plosses_on+ Plosses_off, where Plosses are the losses during the turn-on of the IGBTs and Plosses are the losses during the turn-off the switching devices. Voff is the voltage during the switches being turned off. This voltage depends on the operation of the converter. Ion is the current that flows on the switching devices when transistors are turned on state, Ion=Iload*sin (wg*k*Tsw), where Iload is the load current magnitude. Due to the operation mode of the converter, this current has a sinusoidal waveform, Tsw=1/Fsw, wg=2*pi*Fg. The variable k is the dummy variable to compute the summation of the individual losses from zero to Nsw, where Nsw is the amount of commutations during one cycle of the fundamental signal (1/Fg). In that case Nsw=Fsw/Fg. The variable t_rise and t_fall is the time that takes the load current to go from zero to its value and from it back to zero, respectively. For the case of FB, Voff is always Vdc during all the cycle of the fundamental signal. For the 5L-VSI Voff is Vdc/2 during ⅓ of the time while Vdc during ⅔ of the time of the cycle of the fundamental signal. Thus, the losses for the FB would be: Plosses=sum {k=0:Nsw} (0.5*Vdc*Ion*(t_rise+ t_fall)*Fsw), while for the 5L-VSI, the losses would be: Plosses=sum{k=0:Nsw/12} (Vdc*Ion*(t_rise+t_fall) *Fsw)+sum{k=Nsw/12:5*Nsw/12} (Vdc*Ion*(t_rise+ t_fall)*Fsw). The losses comparison between the FB and the 5L-VSI during positive half of the cycle of one of the fundamental periods of the signal are shown in FIG. 9. This comparison indicates that there will be less losses on the 5L-VSI respect to the FB. These losses are calculated per one semiconductor device which may vary depending on the Vdc, datasheet values t_rise, t_fall and operative point (load). Based on some ideal conditions we have calculated around 7% improvement per fundamental period on one IGBT. That value must be multiplied by 2 devices used for the creation of the voltage levels in each converter, which represents 14% switching loss improvement.

Figure 10:
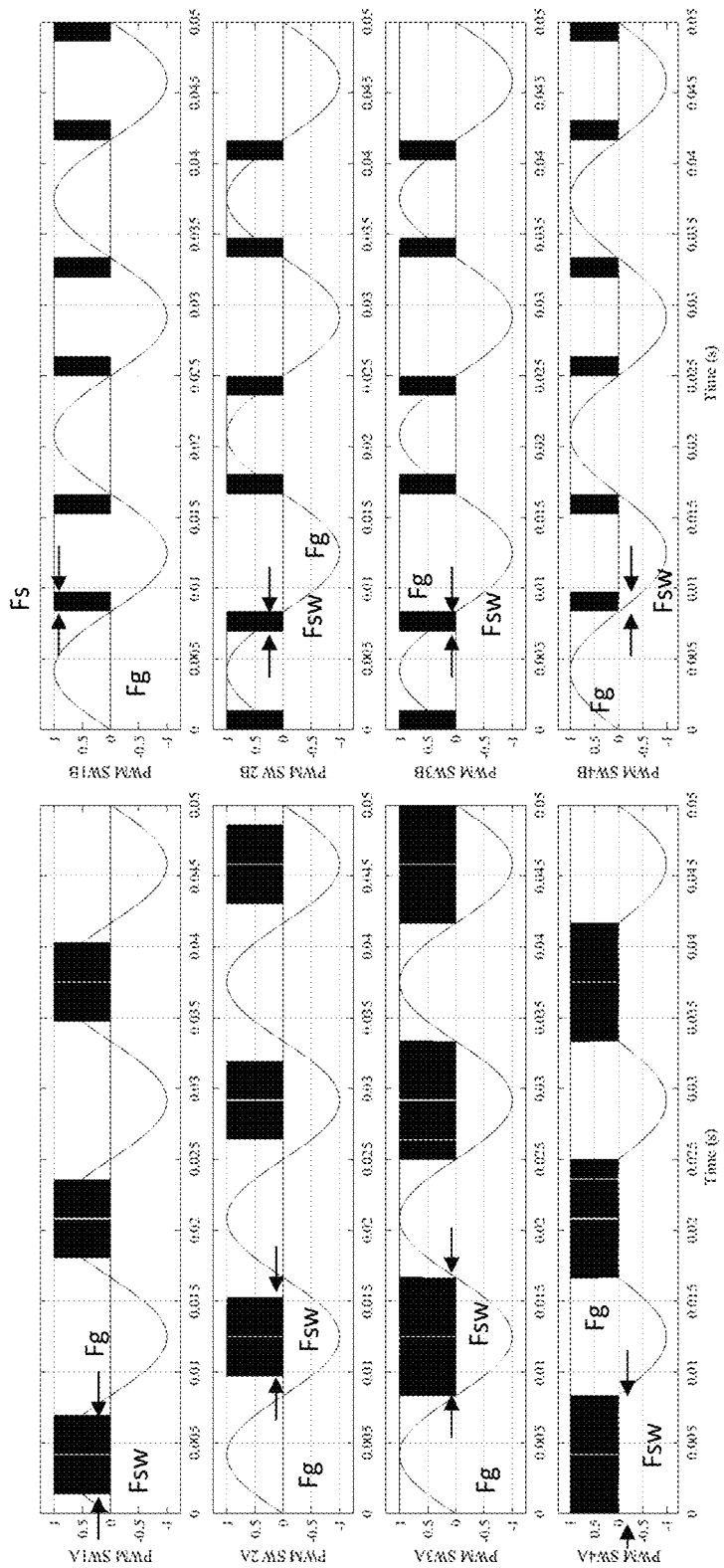
FIG. 10 is set of charts showing the pulse width modulation for the left and right switching legs of a 5L single-phase asymmetric inverter with AC-bypass in accordance with one embodiment of the present invention.

FIG. 10 shows the PWM pulses for the eight switching devices of the left (four switches) and right (four switches) switching legs of the 5L single-phase asymmetric inverter with AC-bypass depicted in, for example, FIG. 2. FIG. 10 shows that in some part of the time of the fundamental period (1/Fg) the commutation of the switching devices occurs at the switching frequency, known as Fsw which is in the order of tens of kilo Hertz, and at other times the commutation of the switching devices commutate occurs at the fundamental frequency, known as Fg. The arrangement of the switches with some commuting at the fundamental frequency of Fg as opposed to the higher frequency Fsw, as depicted in Table II of FIG. 11, results in a reduction in conduction losses.

Figure 12:
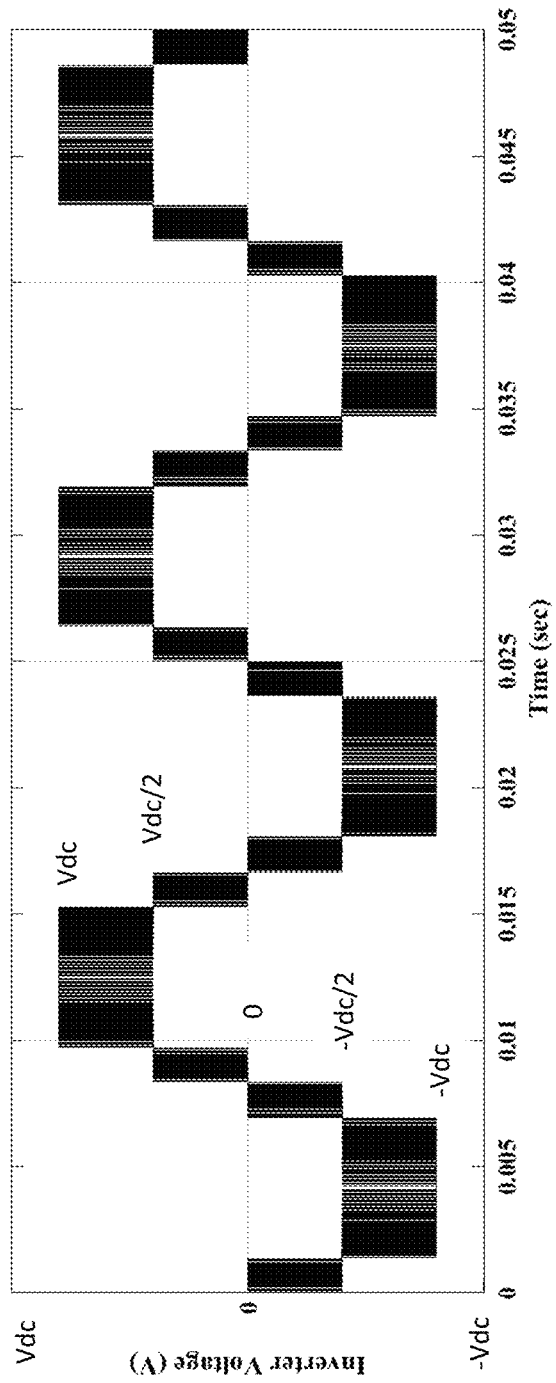
FIG. 12 is the output voltage of a 5L single-phase asymmetric inverter.

FIG. 12 shows the output voltage of the 5L-asymmetric inverter with ac-bypass when the proposed modulation is implemented as explained abovementioned. In this figure the 5 voltage levels are: 0V, Vdc/2, Vdc, −Vdc/2.

Figure 13:
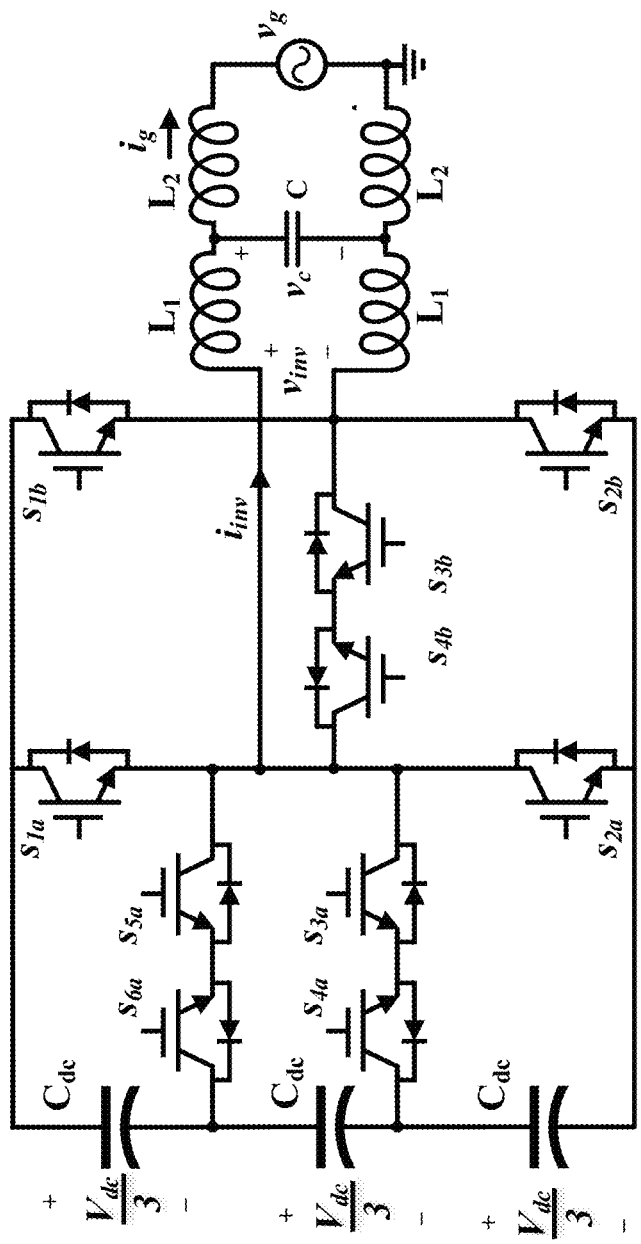
FIG. 13 is a schematic showing the switches in a 7L single-phase asymmetric inverter with AC-bypass in accordance with one embodiment of the present invention.
Figure 14:
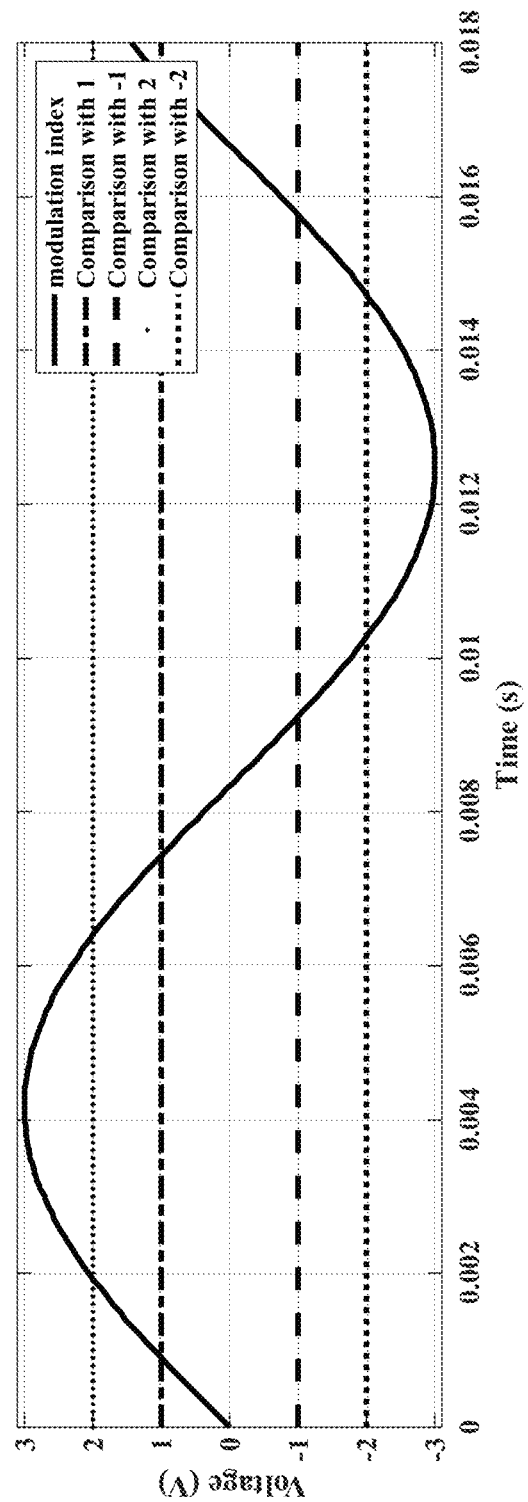
FIG. 14 is a chart showing voltage thresholds for making comparisons on the comparator block on a 7L VSI.

FIG. 13 shows an additional embodiment of the present invention that represents a seven-level (7L) inverter. The DC-link (Vdc) is split into thirds, with an additional T-clamp arm in the left leg of switching as compared to the 5L inverter. The AC-bypass in the right leg remains the same as in the 5L-VSI. Every different multilevel topology from the 5L-VSI, requires an accordingly modified modulation strategy based on the same concept of the one showed for the 5L-VSI. Thus, FIG. 14 shows the comparison thresholds for the modulation index of the 7L-VSI. For the generic case of M level, M minus two (M−2) comparison are required, in this case M equals seven, then minus two is equal to 5 (M−2=7−2=5).

Figure 15B:
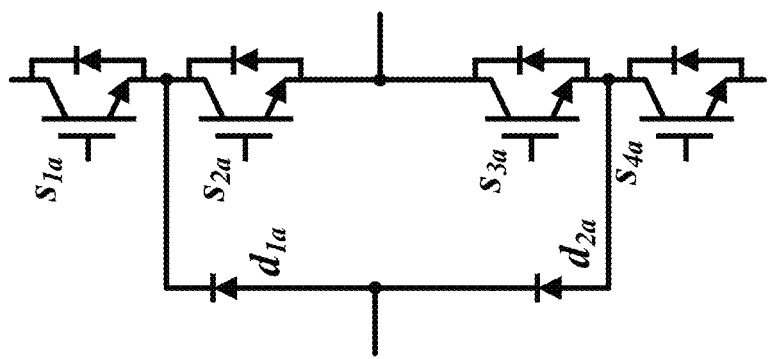
FIG. 15B is a schematic showing the switches in a classical Diode Neutral Point Clamped leg of an inverter.
Figure 15A:
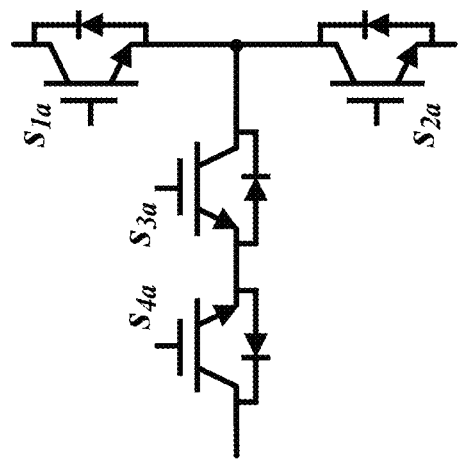
FIG. 15A is a schematic showing the switches in a T-Neutral Point Clamped leg of an inverter.
Figure 16:
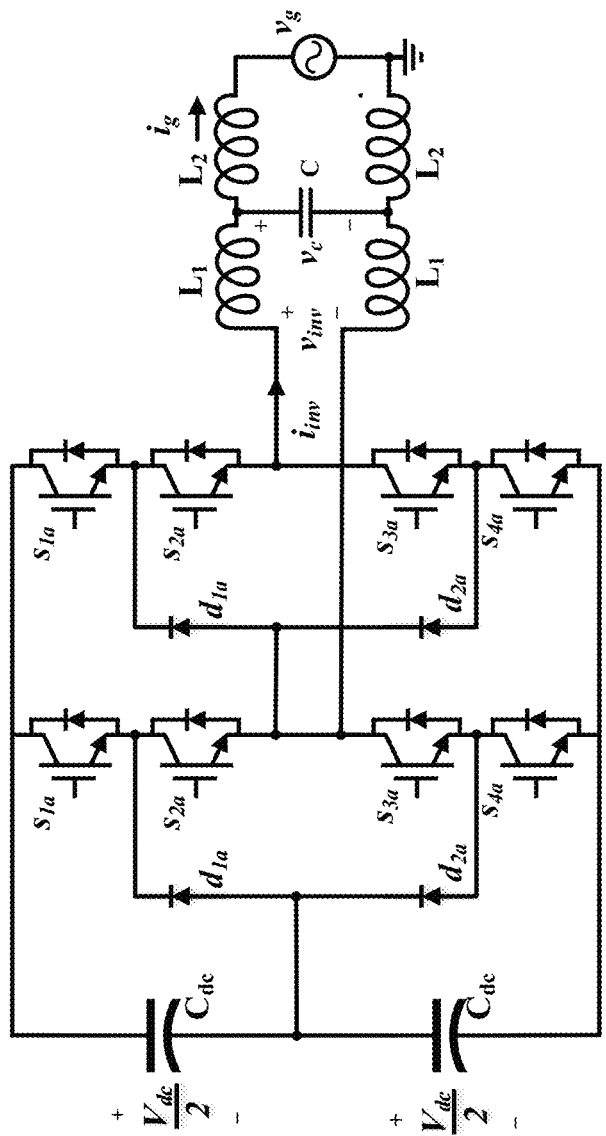
FIG. 16 is the schematic of the 5L-VSI implemented with a classical diode NPC legs instead of with a T-Clamped legs.
Figure 17:
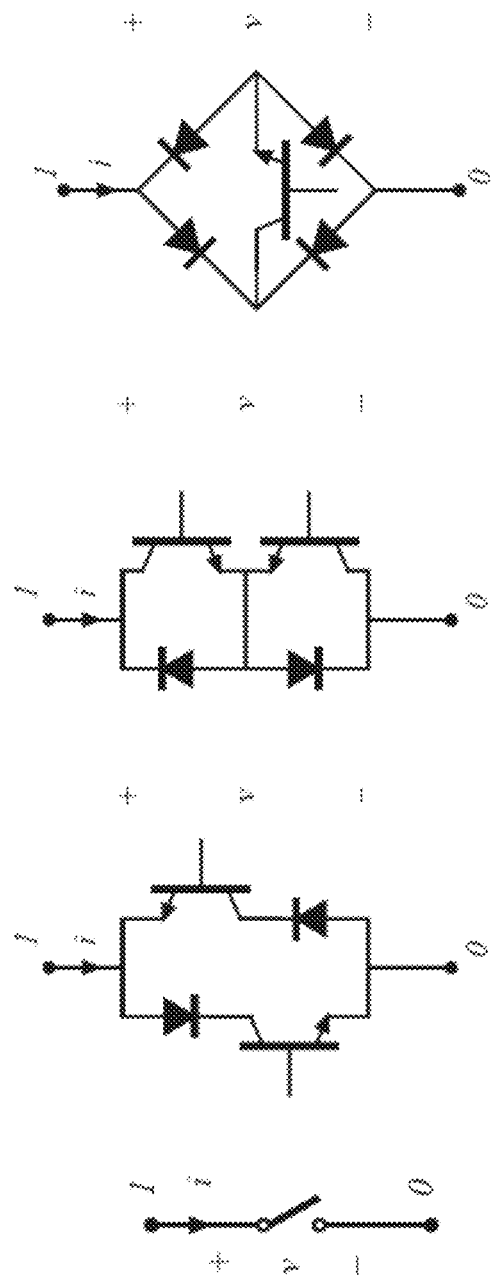
FIG. 17 is a schematic showing various configurations of the four quadrant bidirectional switches for the T-Clamp of a 3L-Neutral Point Claimed inverter.

FIG. 15A is a schematic showing the switches in a T-Clamped leg of an inverter. FIG. 15B is a schematic showing the switches in a typical diode Neutral Point Clamped (NPC) leg of an inverter. FIG. 16 shows the 5L-VSI implemented with the diode NPC observed in FIG. 15B. FIG. 17 is a schematic showing various configurations of the four quadrant bidirectional switches for the T-Clamp of a 3L-Neutral Point Claimed inverter. One of ordinary skill in the art will understand that any type or variation of the NPC leg shown in FIG. 15B may be used to implement various embodiments of the invention. Further, one of ordinary skill in the art will understand that any bidirectional four-quadrants switch, examples of which are given in FIG. 17, may be implemented in place of the T-Clamp.

Figure 18:
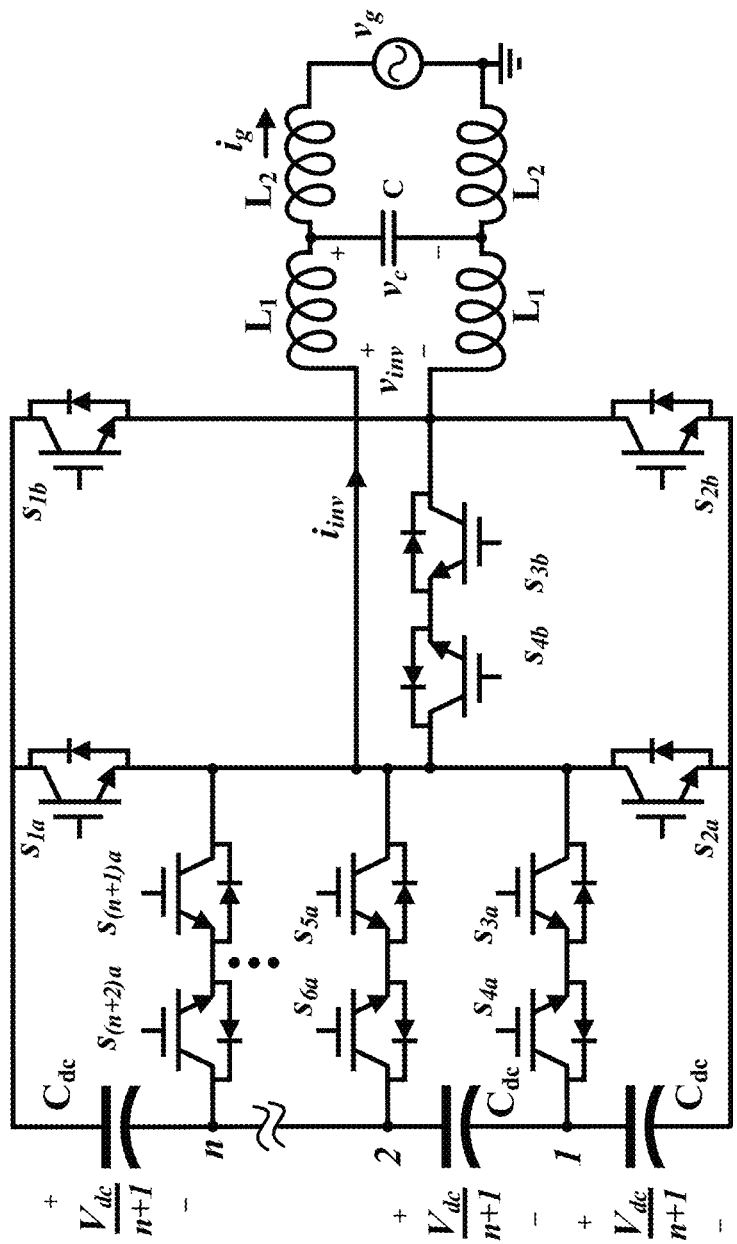
FIG. 18 is a schematic showing an M level asymmetric voltage source inverter with AC-bypass in accordance with one embodiment of the present invention.

This multilevel asymmetric inverter can be extended to (M=2n+3) levels by further dividing the DC-link (Vdc) as fractions of (n+1) and adding additional switching legs to the left side, as seen in FIG. 18.

The proposed inverter topology may be implemented in any type of semiconductor device, including but not limited to IGBT, MOSFET, BJT, GaN, and SiC MOS.

Figure 19:
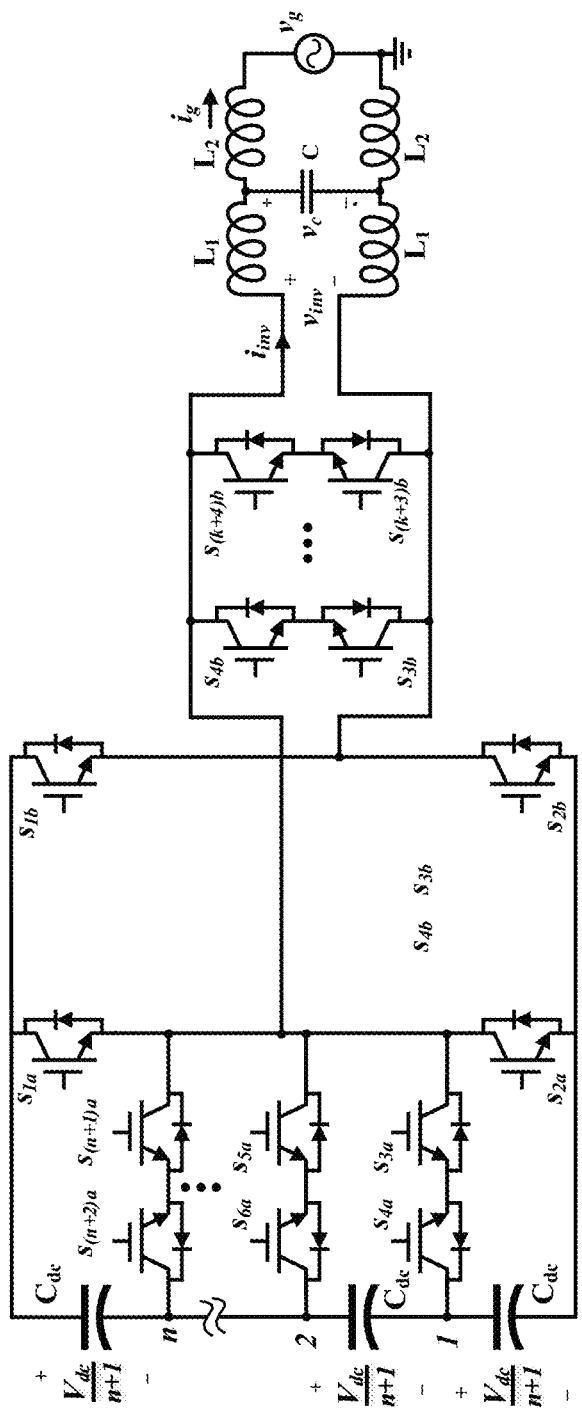
FIG. 19 is a schematic showing an M level asymmetric voltage source inverter with k AC-bypasses in accordance with one embodiment of the present invention.

FIG. 19 shows the ML-VSI with k number of T-clamps as AC-bypass. This correspond to one of the embodiments of this invention. This is the most generic converter and any combination between M and k fall inside the family of the M-Level asymmetric converter with k ac-bypasses.

One application of the present invention is a photovoltaic (PV) inverter for back-up generation, in stand-alone mode or grid connected. A solar inverter or PV inverter is a type of electrical converter which converts the variable DC output of a photovoltaic (PV) solar panel into a utility frequency alternating current (AC) that can be fed into a commercial electrical grid or used by a local, off-grid electrical network. It is a critical balance of system (BOS) component in a photovoltaic system, allowing the use of ordinary AC-powered equipment. Solar power inverters have special functions adapted for use with photovoltaic arrays, including maximum power point tracking and anti-islanding protection.

Another application of the present invention is an uninterruptable power supply (UPS). A UPS is an electrical apparatus that provides emergency power to a load when the input power source or mains power fails. A UPS differs from an auxiliary or emergency power system or standby generator in that it will provide near-instantaneous protection from input power interruptions, by supplying energy stored in batteries, super-capacitors, or flywheels. The on-battery runtime of most uninterruptible power sources is relatively short (only a few minutes), but is sufficient to start a standby power source or properly shut down the protected equipment. It is a type of continual power system.

Yet another application of the present invention is in a variable frequency drive (VFD) for single-phase motor such as a single-phase induction machine or asymmetric monophasic AC machine. A VFD, also referred to as an adjustable-frequency drive, "variable-voltage/variable-frequency (VVVF) drive", variable speed drive, AC drive, micro drive, or inverter drive, is a type of adjustable-speed drive used in electro-mechanical drive systems to control AC motor speed and torque by varying motor input frequency and voltage. VFDs are used in applications ranging from small appliances to large compressors.

Yet another application of the present invention is in DC motors or servo amplifiers, i.e., machines using DC in both directions of the mechanics shaft. A servo drive is a special electronic amplifier used to power electric servomechanisms. A servo drive monitors the feedback signal from the servomechanism and continually adjusts for deviation from expected behavior.

Yet another application of the present invention is in a single-phase rectifier for power supplies with power factor correction. The single-phase rectifier is a device that converts alternating current AC to DC.

Yet another application of the present invention is in a single-phase active power filter (APF) for cleaning the grid current harmonics and performing power factor correction. APFs are filters that can perform the job of harmonic elimination. Active power filters can be used to filter out harmonics in the power system, which are significantly below the switching frequency of the filter. The active power filters are used to filter out both higher and lower order harmonics in the power system.

Yet another application of the present invention is in a single-phase reactive power compensator, which is a device for providing fast-acting reactive power on high-voltage electricity transmission networks. The reactive power compensator is connected to the power system to regulate the voltage and is connected near large industrial loads to improve power quality.

Yet another application of the present invention is in a single-phase regenerative rectifier or synchronous rectifier, which is a bidirectional converter capable of working in the 4 quadrants of the active-reactive chart. In the active quadrant it is capable of consuming active power (rectifier operation) and feeding active power (regenerative operation) with different reactive power points of operation, specifically, at power unity factor (zero reactive power flow) or at other power factors (reactive power consumed or generated).

One of ordinary skill in the art will understand how to implement the embodiments of the present inventions in these applications to achieve the benefits of reduction in noise and ripple and improved efficiency and signal, and without the need for a LF transformer.

The above-described embodiments of the present invention are intended to be examples only. Alterations, modifications, and variations may be effected to the particular embodiments by those of skill in the art without departing from the scope of the invention, which is defined solely by the claims appended hereto.

What is claimed is:

1. A multi-level inverter, comprising:
   a DC power coupling with a DC voltage;
   a plurality of DC link capacitors arranged to create a set of nodes comprising a positive node, a center node, and a negative node;
   a first arrangement of switches, wherein a first side of said first arrangement of switches is coupled to said set of nodes, and a second side of said first arrangement of switches is coupled to a first AC terminal and a second arrangement of switches;
   wherein a first side of said second arrangement of switches is coupled to said first AC terminal and said first arrangement of switches, and a second side of said second arrangement of switches is coupled to a second AC terminal;
   wherein said first arrangement of switches and said second arrangement of switches are configured to produce five levels of voltage between said first AC terminal and said second AC terminal when operated according to a predetermined switching sequence; and
   wherein said predetermined switching sequence includes a zero-output switching configuration that electrically isolates said first AC terminal and said second AC terminal from said set of nodes.

2. The multi-level inverter of claim 1 wherein said predetermined switching sequence includes a first commuting frequency in the range of 1 kHz to 100 kHz.

3. The multi-level inverter of claim 2 wherein said first commuting frequency is 20 kHz.

4. The multi-level inverter of claim 2 wherein said predetermined switching sequence includes a second commuting frequency in the range of 1 Hz to 100 Hz.

5. The multi-level inverter of claim 1 wherein said five levels of voltage approximate the full positive DC voltage, the full positive DC voltage divided by two, zero, the negative DC voltage divided by two, and the full negative DC voltage.

6. The multi-level inverter of claim 4 wherein said five levels of voltage approximate the full positive DC voltage, the full positive DC voltage divided by two, zero, the negative DC voltage divided by two, and the full negative DC voltage.

7. A five-level inverter, comprising:
   a DC power coupling with a DC voltage;
   an AC power coupling;
   two DC link capacitors arranged to create a set of nodes;
   a plurality of switches located between said set of nodes and said AC power coupling; and
   a predetermined switching sequence that generates five voltage output levels;
   wherein said predetermined switching sequence includes a zero-output switching configuration in which said set of nodes is electrically isolated from said AC power coupling.

8. The multi-level inverter of claim 7 wherein said predetermined switching sequence includes a first commuting frequency in the range of 1 kHz to 100 kHz.

9. The multi-level inverter of claim 8 wherein said predetermined switching sequence includes a second commuting frequency in the range of 1 Hz to 100 Hz.

10. The multi-level inverter of claim 7 wherein said five voltage output levels approximate the full positive DC voltage, the full positive DC voltage divided by two, zero, the negative DC voltage divided by two, and the full negative DC voltage.

11. The multi-level inverter of claim 9 wherein said five voltage output levels approximate the full positive DC voltage, the full positive DC voltage divided by two, zero, the negative DC voltage divided by two, and the full negative DC voltage.

12. A multi-level inverter, comprising:
   a DC power coupling with a DC voltage;
   a plurality of DC link capacitors arranged to create a set of nodes;
   a first arrangement of switches, wherein a first side of said first arrangement of switches is coupled to said set of nodes and a second side of said first arrangement of switches is coupled to a first AC terminal and a second arrangement of switches;
   wherein a first side of said second arrangement of switches is coupled to said first AC terminal and said first arrangement of switches, and a second side of said second arrangement of switches is coupled to a second AC terminal;

wherein said first arrangement of switches and said second arrangement of switches are configured to produce greater than five levels of voltage between said first AC terminal and said second AC terminal when operated according to a predetermined switching sequence; and wherein said predetermined switching sequence includes a zero-output switching configuration that electrically isolates said first AC terminal and said second AC terminal from said set of nodes.

13. The multi-level inverter of claim 12 wherein said predetermined switching sequence includes a first commuting frequency in the range of 1 kHz to 100 kHz.

14. The multi-level inverter of claim 13 wherein said first commuting frequency is 20 kHz.

15. The multi-level inverter of claim 13 wherein said predetermined switching sequence includes a second commuting frequency in the range of 1 Hz to 100 Hz.

16. The multi-level inverter of claim 12 wherein said plurality of DC link capacitors comprises exactly three DC link capacitors.

17. The multi-level inverter of claim 12 wherein said plurality of DC link capacitors comprises exactly four DC link capacitors.

18. The multi-level inverter of claim 1, wherein said zero-output switching configuration allows for current to flow through exactly two switches.

19. The five-level inverter of claim 7, wherein said zero-output switching configuration allows for current to flow through exactly two switches.

20. The multi-level inverter of claim 12, wherein said zero-output switching configuration allows for current to flow through exactly two switches.

* * * * *